(12) United States Patent
Harada

(10) Patent No.: US 11,500,357 B2
(45) Date of Patent: Nov. 15, 2022

(54) MEASUREMENT SOLUTION SERVICE PROVIDING SYSTEM

(71) Applicant: TECLOCK SMARTSOLUTIONS CO., LTD., Okaya (JP)

(72) Inventor: Kentaro Harada, Nagano (JP)

(73) Assignee: Teclock Smartsolutions Co., Ltd., Nagano (JP)

( * ) Notice: Subject to any disclaimer, the term of this patent is extended or adjusted under 35 U.S.C. 154(b) by 425 days.

(21) Appl. No.: 16/756,730

(22) PCT Filed: Nov. 21, 2018

(86) PCT No.: PCT/JP2018/043052
§ 371 (c)(1),
(2) Date: Apr. 16, 2020

(87) PCT Pub. No.: WO2019/103056
PCT Pub. Date: May 31, 2019

(65) Prior Publication Data
US 2020/0243204 A1  Jul. 30, 2020

(30) Foreign Application Priority Data
Nov. 21, 2017  (JP) ............................ JP2017-223961

(51) Int. Cl.
*G05B 19/418* (2006.01)
*G16Y 20/10* (2020.01)
(Continued)

(52) U.S. Cl.
CPC ........... *G05B 19/418* (2013.01); *G06N 20/00* (2019.01); *G16Y 10/25* (2020.01); *G16Y 20/10* (2020.01); *G16Y 40/20* (2020.01)

(58) Field of Classification Search
CPC ...... G05B 19/418; G16Y 20/10; G16Y 10/25; G16Y 40/20
(Continued)

(56) References Cited

U.S. PATENT DOCUMENTS

2003/0176990 A1* 9/2003 Kojima .................... H04Q 9/00
702/186
2006/0058982 A1* 3/2006 Yamada ................ G06F 13/385
702/189
(Continued)

FOREIGN PATENT DOCUMENTS

| JP | 7-190798 | 7/1995 |
|----|----------|--------|
| JP | 7-225609 | 8/1995 |

(Continued)

OTHER PUBLICATIONS

International Search Report issued in International Application No. PCT/JP2018/043052, dated Jan. 29, 2019, 4 pages.

*Primary Examiner* — Tauqir Hussain
(74) *Attorney, Agent, or Firm* — Hamre, Schumann, Mueller & Larson, P.C.

(57) ABSTRACT

A computing system is configured to analyze both measurement data and indicator data as big data aggregated in measurement database and indicator database by deep learning for each lot of a part or for each lot of a finished product and a part pre-associated with each other, and also for each consolidation target between bases subordinate to the same start point corresponding to identification information that specifies a business user of the computing system. Analysis target layers by the deep learning are a three-layer serial hierarchical structure containing a production condition layer and an environment condition layer as a start point for analysis of a part layer, or a four-layer serial hierarchical structure containing a part layer, a production condition (Continued)

layer, and an environment condition layer as a start point for analysis of a finished product layer.

17 Claims, 6 Drawing Sheets

(51) Int. Cl.
*G16Y 10/25* (2020.01)
*G16Y 40/20* (2020.01)
*G06N 20/00* (2019.01)

(58) Field of Classification Search
USPC .......................................................... 700/96
See application file for complete search history.

(56) References Cited

U.S. PATENT DOCUMENTS

| | | | |
|---|---|---|---|
| 2010/0049566 A1 | 2/2010 | Fukuoka et al. | |
| 2012/0254141 A1 | 10/2012 | Poland et al. | |
| 2013/0268357 A1* | 10/2013 | Heath | G06Q 10/10 726/26 |
| 2014/0075019 A1* | 3/2014 | Mordani | G06F 9/5072 709/224 |
| 2014/0257764 A1* | 9/2014 | Seki | G06Q 10/103 703/1 |
| 2014/0337429 A1* | 11/2014 | Asenjo | H04L 67/10 709/204 |
| 2014/0343743 A1* | 11/2014 | DaCunha | H02P 25/024 713/340 |
| 2014/0359552 A1 | 12/2014 | Misra et al. | |
| 2014/0380264 A1 | 12/2014 | Misra et al. | |
| 2015/0268282 A1* | 9/2015 | Ahmadi | G06Q 50/04 702/62 |
| 2015/0310195 A1* | 10/2015 | Bailor | G06F 21/45 726/6 |
| 2016/0085594 A1* | 3/2016 | Wang | G06F 9/5077 709/226 |
| 2016/0269378 A1* | 9/2016 | Ye | G06Q 40/06 |
| 2017/0003677 A1 | 1/2017 | Hsu et al. | |
| 2017/0006135 A1* | 1/2017 | Siebel | G06N 20/00 |
| 2017/0139398 A1 | 5/2017 | Tsuzuki et al. | |
| 2017/0171090 A1 | 6/2017 | Britt et al. | |
| 2018/0018590 A1* | 1/2018 | Szeto | G16H 40/20 |
| 2018/0027006 A1* | 1/2018 | Zimmermann | G06F 21/6218 726/11 |
| 2021/0027309 A1* | 1/2021 | Wells | G06Q 40/08 |
| 2021/0193320 A1* | 6/2021 | Shukla | G06N 3/084 |
| 2022/0156558 A1* | 5/2022 | Samuni | G06N 3/0445 |

FOREIGN PATENT DOCUMENTS

| | | |
|---|---|---|
| JP | 2002-251212 | 9/2002 |
| JP | 2003-090742 | 3/2003 |
| JP | 2003-272074 | 9/2003 |
| JP | 2004-227184 | 8/2004 |
| JP | 2005-327024 | 11/2005 |
| JP | 2014-522514 | 9/2014 |
| JP | 2014-534487 | 12/2014 |
| JP | 2015-501459 | 1/2015 |
| JP | 2015-534167 | 11/2015 |
| JP | 2016-522939 | 8/2016 |
| JP | 2016-224578 | 12/2016 |
| JP | 2017-027118 | 2/2017 |
| JP | 2017-097839 | 6/2017 |
| KR | 10-2016-0148911 | 12/2016 |
| WO | 2008/007493 | 1/2008 |

\* cited by examiner

MEASUREMENT DATA AA, BB, CC, DD

INDICATOR DATA aa, bb, cc, dd

MEASUREMENT DATA EE IN STANDARD FORMAT

FIG. 6

DB1 MEASUREMENT DATABASE

| (BUSINESS USER IDENTIFICATION INFORMATION) | (BASE IDENTIFICATION INFORMATION) | (MEASUREMENT SOURCE IDENTIFICATION INFORMATION) | (LOT NUMBER) | (MEASUREMENT VALUE) | (MEASUREMENT TIME INFORMATION) | |
|---|---|---|---|---|---|---|
| ID1 | ID2-1 (X) | ID3-A | LTA1<br>LTA2<br>LTA3 | MVA1<br>MVA2<br>MVA3 | MTA1<br>MTA2<br>MTA3 | * |
| | | ID3-B | LTB1<br>LTB2<br>LTB3 | MVB1<br>MVB2<br>MVB3 | MTB1<br>MTB2<br>MTB3 | * |
| | | ID3-C | LTC1<br>LTC2<br>LTC3 | MVC1<br>MVC2<br>MVC3 | MTC1<br>MTC2<br>MTC3 | * |
| | | ID3-D | LTX1<br>···LTX11<br>LTX27 | MVX1<br>···MVX11<br>MVX27 | MTX1<br>···MTX11<br>MTX27 | * |
| | ID2-2(Y) | | ... | | | |
| | ID2-N (Z) | ID3-A | LTA1<br>LTA2<br>LTA3 | MVA1<br>MVA2<br>MVA3 | MTA1<br>MTA2<br>MTA3 | |
| | | ID3-B | LTB1<br>LTB2<br>LTB3 | MVB1<br>MVB2<br>MVB3 | MTB1<br>MTB2<br>MTB3 | |
| | | ID3-C | LTC1<br>LTC2<br>LTC3 | MVC1<br>MVC2<br>MVC3 | MTC1<br>MTC2<br>MTC3 | |
| | | ID3-D | LTX1<br>···LTX11<br>LTX27 | MVX1<br>···MVX11<br>MVX27 | MTX1<br>···MTX11<br>MTX27 | |
| (START POINT) | (BRANCH POINT) | | (END POINT) | | | |

(HIERARCHICAL STRUCTURE ADOPTING LOGICAL TREE FORM OF MEASUREMENT DATA EE IN STANDARD FORMAT)

FIG. 7

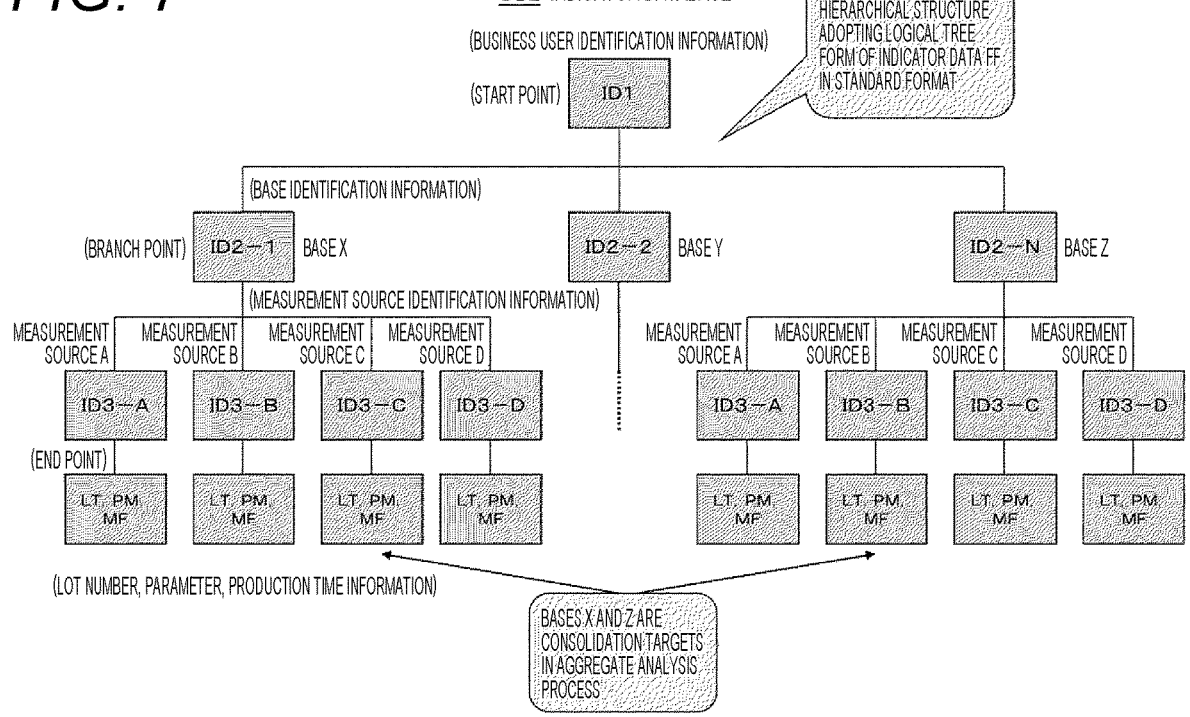

FIG. 8

DB2 INDICATOR DATABASE

| (BUSINESS USER IDENTIFICATION INFORMATION) | (BASE IDENTIFICATION INFORMATION) | (MEASUREMENT SOURCE IDENTIFICATION INFORMATION) | (LOT NUMBER) | (PARAMETER) | (PRODUCTION TIME INFORMATION) | |
|---|---|---|---|---|---|---|
| ID1 | ID2-1 (X) | ID3-A | LTA1<br>LTA2<br>LTA3 | PMA1<br>PMA2<br>PMA3 | MFA1<br>MFA2<br>MFA3 | * |
| | | ID3-B | LTB1<br>LTB2<br>LTB3 | PMB1<br>PMB2<br>PMB3 | MFB1<br>MFB2<br>MFB3 | * |
| | | ID3-C | LTC1<br>LTC2<br>LTC3 | PMC1<br>PMC2<br>PMC3 | MFC1<br>MFC2<br>MFC3 | * |
| | | ID3-D | LTX1<br>···LTX11<br>LTX27 | PMX1<br>···PMX11<br>PMX27 | MFX1<br>···MFX11<br>MFX27 | * |
| | ID2-2(Y) | | ... | | | |
| | ID2-N (Z) | ID3-A | LTA1<br>LTA2<br>LTA3 | PMA1<br>PMA2<br>PMA3 | MFA1<br>MFA2<br>MFA3 | |
| | | ID3-B | LTB1<br>LTB2<br>LTB3 | PMB1<br>PMB2<br>PMB3 | MFB1<br>MFB2<br>MFB3 | |
| | | ID3-C | LTC1<br>LTC2<br>LTC3 | PMC1<br>PMC2<br>PMC3 | MFC1<br>MFC2<br>MFC3 | |
| | | ID3-D | LTX1<br>···LTX11<br>LTX27 | PMX1<br>···PMX11<br>PMX27 | MFX1<br>···MFX11<br>MFX27 | |

(HIERARCHICAL STRUCTURE ADOPTING LOGICAL TREE FORM OF INDICATOR DATA FF IN STANDARD FORMAT)

(START POINT)　　(BRANCH POINT)　　(END POINT)

FIG. 9

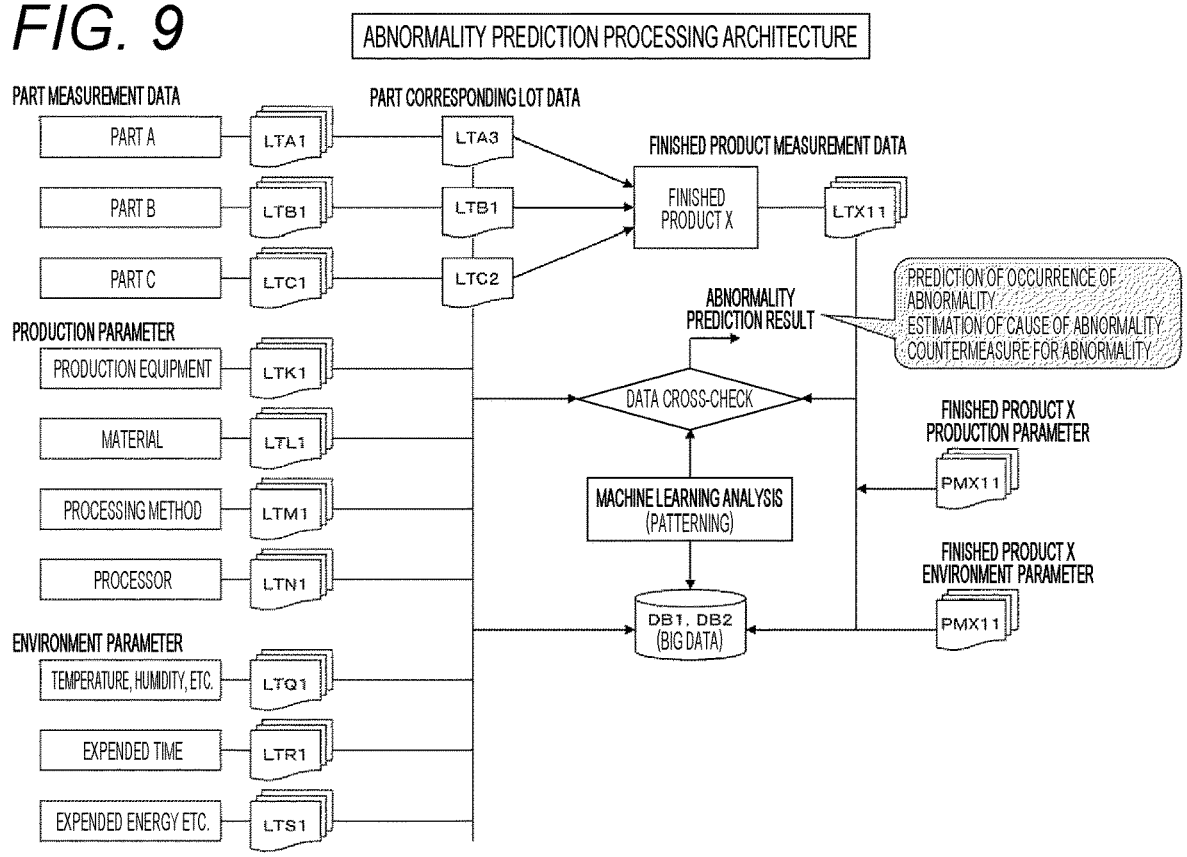

MEASUREMENT SOLUTION SERVICE PROVIDING SYSTEM

TECHNICAL FIELD

The present invention relates to a measurement solution service providing system, and furthermore relates to a measurement solution service providing method, a computing system, and a measurement solution service providing program.

BACKGROUND ART

Recently, a technology referred to as the internet of things (IoT) has been gaining attention. IoT is one technology for achieving the utilization of data produced from objects by making all kinds of objects (sometimes also referred to as things) capable of accessing the open Internet.

IoT technology is anticipated to be a fourth industrial revolution, and is rapidly changing a variety of industrial fields by connecting things to the Internet. For example, user spending has grown an average of 16.9% in the Japanese domestic market, and the Japanese domestic market is expected to reach 14 trillion yen in 2020. Additionally, Germany is beginning to implement industrie 4.0, and is an active market globally.

Given such background, in the measuring instrument manufacturing industry, the current fiscal year is poised to become the first year of the IoT era, in which an overhaul of infrastructure (also referred to as "infra" or the foundation) as well as the development of measurement systems utilizing IoT technology are anticipated.

However, a system providing a measurement solution service that fulfills such expectations has not been proposed so far. For example, in Patent Literature 1, background technology related to IoT technology has been proposed in relation to cloud computing technology. In Patent Literature 2 and 3, background technology related to cloud computing technology is proposed. Also, in Patent Literature 4, a technology related to the collection of measurement (instrumentation) data is proposed. In Patent Literature 5, a technology related to the display of measurement data is proposed. Furthermore, Patent Literature 6 discloses technology related to a manufacturing facility management system that predicts an apparatus state and tendency of a manufacturing line from big data stored on a data server, and transmits a prediction of a period when trouble will occur as well as troubleshooting measures or optimal corrected values of set values to the manufacturing line.

RELATED ART LITERATURE

Patent Literature

Patent Literature 1: JP 2016-522939 A
Patent Literature 2: JP 2015-534167 A
Patent Literature 3: JP 2016-224578 A
Patent Literature 4: JP 2003-272074 A
Patent Literature 5: JP 2003-90742 A
Patent Literature 6: JP 2017-27118 A

DISCLOSURE OF THE INVENTION

Problems to be Solved by the Invention

Furthermore, when measurement data transmitted from a plurality of measurement sources distributively arranged throughout a manufacturing base (site) is collected and processed for aggregate analysis and display, the following four issues are major challenges for a measurement system of the related art.

(1) Increases in the cost of aggregating the measurement data are unavoidable. In other words, data aggregation takes much human labor, and operating costs increase.

(2) The display of an aggregate data analysis result lacks immediacy. For this reason, the response to situations such as degraded quality is delayed, and there is a risk of quality accidents or trouble occurring.

(3) It is difficult to consolidate aggregation forms and data across manufacturing bases. In other words, because data aggregation and analysis are typically performed at each base, consolidating the data takes many man-hours and labor.

(4) Automating data analysis is difficult. In other words, automating the data analysis incurs costs such as the costs of introducing a server and dedicated software individually at each base.

An object is to provide technology making it possible to achieve a revolutionary measurement solution service related to measurement data processing by at least linking IoT technology with artificial intelligence (AI) technology.

Means for Solving the Problems

In order to achieve the object described above, a measurement solution service providing system according to a first aspect includes an IoT relay device that collects measurement data transmitted from a plurality of measurement sources that is distributively arranged in each process in a base corresponding to a manufacturing site and that measures quality conditions in a finished product production process and a part production process, and indicator data that is transmitted from the plurality of measurement sources and that includes an environment indicator and a production indicator acting as influencing factors when measuring the quality conditions; and a computing system that includes aggregate processing means for receiving the measurement data and the indicator data transmitted from the IoT relay device through a communication network, and aggregating the received measurement data and the received indicator data into a measurement database and an indicator database for generating big data, analyzing means for analyzing both the measurement data and the indicator data as the big data aggregated in the measurement database and the indicator database by classifying and cross-checking characteristic tendencies according to machine learning for each lot of a finished product and a part pre-associated with each other, and predicting an abnormality, and display processing means for displaying and processing an abnormality prediction result from the analyzing means for transmission to a viewer terminal.

A measurement solution service providing system according to a second aspect includes an IoT relay device that collects measurement data transmitted from a plurality of measurement sources that is distributively arranged in each process in a base corresponding to a manufacturing site and that measures quality conditions in a finished product production process and a part production process, and indicator data that is transmitted from the plurality of measurement sources and that includes an environment indicator and a production indicator acting as influencing factors when measuring the quality conditions; and a computing system that includes aggregate processing means for receiving the measurement data and the indicator data transmitted from the IoT relay device through a communication network, and aggregating the received measurement data and the received indicator data into a measurement database and an indicator database for generating big data, analyzing means for analyzing both the measurement data and the indicator data as the big data aggregated in the measurement database and the indicator database by deep learning that treats a hierarchical structure as analysis target layers for each lot of a part or for each lot of a finished product and a part pre-associated with each other, and computing an optimal influencing factor condition, and display processing means for displaying and processing the optimal influencing factor condition computed by the analyzing means for transmission to a viewer terminal.

A measurement solution service providing system according to a third aspect includes an IoT relay device that collects measurement data transmitted from a plurality of measurement sources that is distributively arranged in each process in a base corresponding to a manufacturing site and that measures quality conditions in a finished product production process and a part production process, and indicator data that is transmitted from the plurality of measurement sources and that includes an environment indicator and a production indicator acting as influencing factors when measuring the quality conditions; and a computing system that includes aggregate processing means for receiving the measurement data and the indicator data transmitted from the IoT relay device through a communication network, and aggregating the received measurement data and the received indicator data into a measurement database and an indicator database for generating big data, first analyzing means for analyzing both the measurement data and the indicator data as the big data aggregated in the measurement database and the indicator database by classifying and cross-checking characteristic tendencies according to machine learning for each lot of a finished product and a part pre-associated with each other, and predicting an abnormality, and second analyzing means for analyzing both the measurement data and the indicator data as the big data aggregated in the measurement database and the indicator database by deep learning that treats a hierarchical structure as analysis target layers for each lot of a part or for each lot of a finished product and a part pre-associated with each other, and computing an optimal influencing factor condition, and first display processing means for displaying and processing an abnormality prediction result from the first analyzing means for transmission to a viewer terminal, and second display processing means for displaying and processing the optimal influencing factor condition computed by the second analyzing means for transmission to the viewer terminal.

In each aspect, a plurality of the IoT relay devices is each disposed at each base.

In each aspect, the analyzing means, the first analyzing means, or the second analyzing means analyzes both the measurement data and the indicator data as the big data aggregated in the measurement database and the indicator database for each lot of the part or for each lot of the finished product and the part pre-associated with each other, and also for each consolidation target between bases.

In each aspect, the aggregate processing means aggregates the received measurement data and the received indicator data in a hierarchical structure in the measurement database and the indicator database, respectively.

In each aspect, the production indicator includes at least one from among information related to production equipment, a material, a processing method, and a processing person used at each of the plurality of measurement sources as a parameter.

In each aspect, the environment indicator includes at least one from among information related to a temperature, a humidity, a pressure, and a work time period at each of the plurality of measurement sources as a parameter.

In each aspect, the IoT relay device further includes means for generating measurement data in a standard format on a basis of the collected measurement data, means for generating indicator data in a standard format on a basis of the collected indicator data, and means for transmitting the measurement data in the standard format and the indicator data in the standard format to the computing system through the communication network to request processing of the generated measurement data and indicator data in the standard format.

In each aspect, the measurement data is measurement data in a standard format having a predetermined data length and including at least identification information that specifies a business user of the computing system, identification information that specifies the base corresponding to the manufacturing site, identification information that specifies the measurement source, a lot number of the finished product or the part to be measured at the measurement source, a measurement value of the finished product or the part to be measured at the measurement source, and measurement time information as predetermined items.

In each aspect, the measurement data in a standard format is aggregated into the measurement database in a hierarchical structure that adopts a logical tree form taking the identification information that specifies the business user of the computing system as a start point, the identification information that specifies the base corresponding to the manufacturing site and the identification information that specifies the measurement source as branch points, and the lot number and the measurement value at the measurement source and the measurement time information as end points.

In each aspect, the indicator data is indicator data in a standard format having a predetermined data length and including at least identification information that specifies a business user of the computing system, identification information that specifies the base corresponding to the manufacturing site, identification information that specifies the measurement source, a lot number of the finished product or the part to be measured at the measurement source, a production indicator and an environment indicator at the measurement source, and production time information as predetermined items.

In each aspect, the indicator data in a standard format is aggregated into the indicator database in a hierarchical structure that adopts a logical tree form taking the identification information that specifies the business user of the computing system as a start point, the identification information that specifies the base corresponding to the manufacturing site and the identification information that specifies the measurement source as branch points, and the lot number, the production indicator and the environment indicator at the measurement source, and the production time information as end points.

In each aspect, each of the plurality of measurement sources includes a measuring instrument and an indicator detector, the computing system includes a SaaS cloud, the IoT relay device is an IoT gateway, and the communication network is an IP network.

Other aspects are realizable as a measurement solution service providing method, a computing system, and a measurement solution service providing program.

Effects of Invention

According to the disclosed technology, by at least linking IoT technology and AI technology to accumulate measurement data and indicator data for generating big data in a computing system and perform an aggregate analysis process and a display process, a revolutionary measurement solution service making it possible to grasp, anytime and anywhere, the quality conditions in each step (process) at a manufacturing base can be provided.

Other objects, features, and advantages will become apparent from a reading of the following detailed description when taken in conjunction with the drawings and the appended claims.

BRIEF DESCRIPTION OF THE DRAWINGS

FIG. 6 is a diagram for explaining a hierarchical structure and a data storage example of measurement data in a standard format in a measurement database;

FIG. 7 is a diagram for explaining a hierarchical structure of indicator data in a standard format in an indicator database;

FIG. 8 is a diagram for explaining a hierarchical structure and a data storage example of indicator data in a standard format in an indicator database;

FIG. 9 is a diagram for explaining an abnormality prediction processing architecture in the system according to the embodiment;

MODE FOR CARRYING OUT THE INVENTION

Hereinafter, a more detailed description will be given with reference to the attached drawings. The drawings illustrate a preferred embodiment. However, embodiments can be carried out in many different forms, and are not limited to the embodiment described in this specification.

[Measurement Solution Service Providing System]

Figure 1:
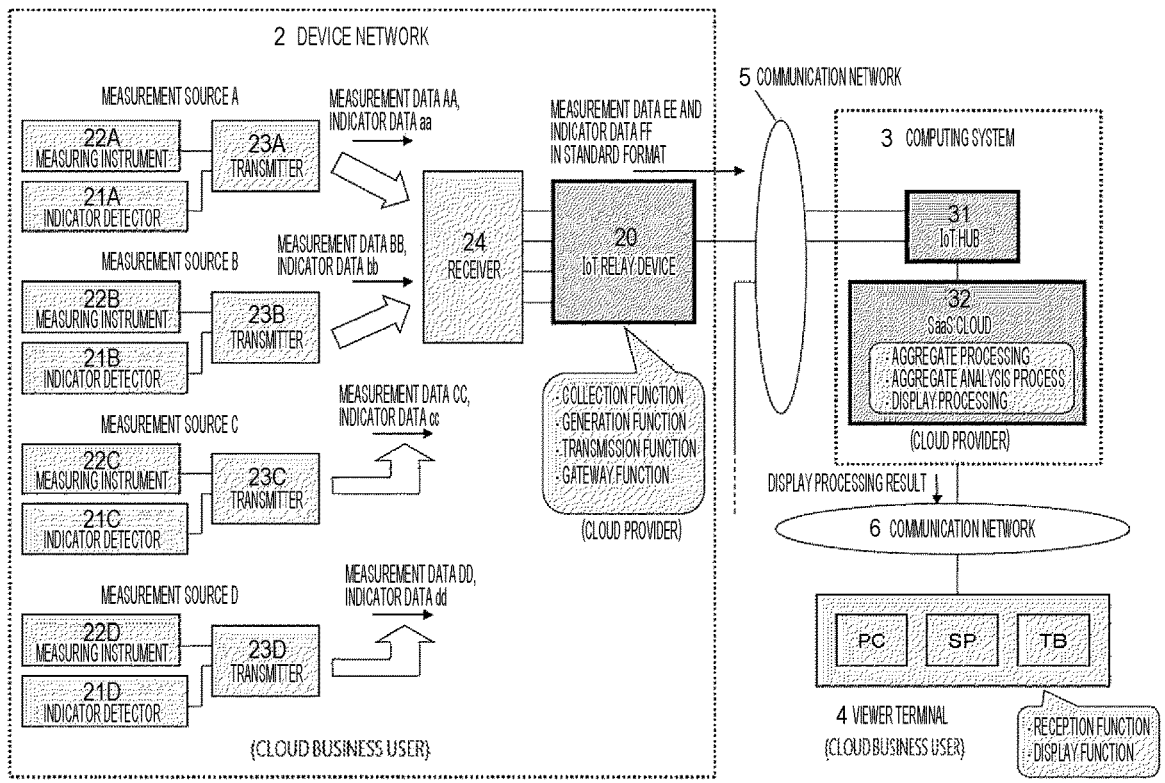
FIG. 1 is a block diagram illustrating a configuration of a measurement solution service providing system according to an embodiment.

Referring to FIG. 1 illustrating a system configuration according to an embodiment, there is provided a measurement solution service providing system 1 includes by linking IoT technology, cloud computing technology, and AI technology to accumulate measurement data and indicator data for generating big data (large amount of known information) in a computing system and perform an aggregate analysis process and a display process, a revolutionary measurement solution service making it possible to grasp, anytime and anywhere, the quality conditions in each step (part production steps and finished product production steps) at a manufacturing base (site) can be provided.

A measurement solution service providing system 1 is provided with a plurality of device networks 2, a computing system 3, a viewer terminal 4, a first communication network 5, and a second communication network 6. Herein, because the system 1 is presumed to be an application of IoT technology, the first communication network 5 and the second communication network 6 are IP networks, and more specifically, the open Internet. Note that the communication networks 5 and 6 may also be the same network.

Each device network 2 is a local area network (LAN) set up at a manufacturing site, or in other words a manufacturing facility (factory), of a contractor (a cloud business user) using the computing system 3. Each device network 2 is set up at each manufacturing site domestic and/or abroad, and therefore a plurality of the device networks 2 exists, but herein, a single device network 2 is illustrated as a representative example.

Each device network 2 is provided with: an IoT relay device 20; a plurality of indicator detectors 21A, 21B, 21C, and 21D, measuring instruments 22A, 22B, 22C, and 22D, and wireless transmitters 23A, 23B, 23C, and 23D that act as respective measurement sources A, B, C, and D; and a wireless receiver 24.

In the plurality of measurement sources A, B, C, and D, which is distributively (dispersedly) arranged to each step (process) in the manufacturing site to measure the quality conditions of part production steps (processes) and finished product production steps (processes), the measuring instruments 22A, 22B, 22C, and 22D are digital measuring instruments that respectively transmit measurement data AA, BB, CC, and DD to the wireless receiver 24 by short-range wireless communication via the connected wireless transmitters 23A, 23B, 23C, and 23D. The measurement data AA, BB, CC, and DD are autonomously transmitted at predetermined intervals T1, T2, T3, and T4 for each of the plurality of measurement sources A, B, C, and D, respectively. The predetermined intervals T1, T2, T3, T4 correspond to sampling times (for example, several minutes or several dozen minutes) appropriate for grasping the quality conditions of the parts and the finished products which are the objects (things) in each step at the manufacturing site, and herein correspond to unit lots (single lots) of each part or finished product. Note that in the case where a measuring instrument is an analog measuring instrument, the measurement data is transmitted to the IoT relay device 20 by wired communication without going through the wireless receiver 24.

In the plurality of measurement sources A, B, C, and D, which is distributively arranged to each step in the manufacturing site to measure the quality conditions of part production steps and finished product production steps, the indicator detectors 21A, 21B, 21C, and 21D are digital detectors that respectively transmit indicator data aa, bb, cc, and dd (parameter data) including environment indicators (environment parameters) and production indicators (production parameters) to the wireless receiver 24 by short-range wireless communication via the connected wireless transmitters 23A, 23B, 23C, and 23D. The indicator data aa, bb, cc, and dd are autonomously transmitted at predetermined intervals T11, T12, T13, and T14 for each of the plurality of measurement sources A, B, C, and D, respectively. The predetermined intervals T11, T12, T13, T14 correspond to appropriate sampling times (for example, several minutes or several dozen minutes) of environment indicators and production indicators influenced in grasping the quality conditions of the parts and the finished products which are the objects (things) in each step at the manufacturing site, and herein correspond to unit lots (single lots) of each part or finished product. Therefore, the predetermined intervals T11, T12, T13, and T14 are absolutely equal to the predetermined intervals T1, T2, T3, and T4 described above, but may be relatively different. Note that in the case where an indicator detector is an analog detector, the indicator data is transmitted to the IoT relay device 20 by wired communication without going through the wireless receiver 24.

Figure 2A:
FIG. 2A is a diagram for explaining measurement data in the system according to the embodiment.

As illustrated in the example of FIG. 2A, the measurement data AA, BB, CC, and DD transmitted to the wireless receiver 24 from the plurality of measurement sources A, B, C, and D includes at least the fields (items) of a measurement data flag F1 that indicates the type of data, a lot number LT of the part or finished product being measured, and a measurement value MV (for example, the dimensions) of the part or finished product being measured. Herein, the measurement value MV includes the units of measurement (for example, mm or cm), but the units of measurement may also be included in a separate field. Also, herein, the lot number LT is sequentially assigned in ascending order to each of the predetermined intervals T1, T2, T3, and T4 in the wireless transmitters 23A, 23B, 23C, and 23D. Note that the measurement data flag F1 and the lot number LT may also be assigned in the IoT relay device 20.

In addition, because the measurement data AA, BB, CC, and DD transmitted to the wireless receiver 24 from the plurality of measurement sources A, B, C, and D has a different data length (for example, from several bytes to several dozen bytes) for each measurement source, and furthermore includes a different measurement value to be measured (such as dimensions, weight, and hardness, for example) at each measurement source together with the lot number, the measurement data may also take different formats from each other.

Figure 2B:
FIG. 2B is a diagram for explaining indicator data in the system according to the embodiment.

As illustrated in FIG. 2B, indicator data aa, bb, cc, and dd transmitted to the wireless receiver 24 from the plurality of measurement sources A, B, C, and D includes the fields of an indicator data flag F2 that indicates the type of data, the lot number LT for each of the plurality of measurement sources A, B, C, and D, and production indicators (production parameters) PM for each of the plurality of measurement sources A, B, C, and D. Herein, the production indicators PM include information related to the production equipment used, the material (material supplier), the processing method, and the processor (worker/processing person). The production indicators PM are preset in the indicator detectors 21A, 21B, 21C, and 21D by a worker, for example. Also, herein, the lot number LT is sequentially assigned in ascending order to each of the predetermined intervals T11, T12, T13, and T14 in the wireless transmitters 23A, 23B, 23C, and 23D. Note that the indicator data flag F2 and the lot number LT may also be assigned in the IoT relay device 20.

Also, as illustrated in the example of FIG. 2B, the indicator data aa, bb, cc, and dd additionally includes the field of environment indicators (environment parameters) PM for each of the plurality of measurement sources A, B, C, and D. Herein, the environment indicators PM include information related to the temperature (° C.), humidity (%), pressure (air pressure/wind pressure) (kPa), and the work time period. Furthermore, the environment indicators PM include the expended time (including work, setup, and wait time), the expended subsidiary material, and the expended energy. These environment indicators PM are automatically added in the indicator detectors 21A, 21B, 21C, and 21D, or preset in the indicator detectors 21A, 21B, 21C, and 21D by a worker.

The indicator data aa, bb, cc, and dd has a different data length for each measurement source, and furthermore includes indicator information (parameter) of fields different at each measurement source together with the lot number, the indicator data may also take different formats from each other.

The reasons why the measurement data AA, BB, CC, and DD and the indicator data aa, bb, cc, and dd described above are different formats are that the measuring instruments 22A, 22B, 22C, and 22D, the indicator detectors 21A, 21B, 21C, and 21D, and the wireless transmitters 23A, 23B, 23C, and 23D may be from different manufacturers, the measuring instruments 22A, 22B, 22C, and 22D may be of different types depending on the target of measurement, the indicator detectors 21A, 21B, 21C, and 21D may be of different types depending on the target of detection, and the like.

The wireless receiver 24 receives the measurement data AA, BB, CC, and DD and the indicator data aa, bb, cc, and dd transmitted from the measurement sources A, B, C, and D, and inputs the data into the IoT relay device 20.

Specifically, each IoT relay device 20 is an IoT gateway provided by a cloud provider, and includes a function of collecting in real time (more strictly, at the above intervals) the measurement data AA, BB, CC, and DD transmitted from the plurality of measurement sources A, B, C, and D distributively arranged to each step in the base corresponding to the manufacturing site to measure the quality conditions of part production steps and finished product production steps, and the indicator data aa, bb, cc, and dd including environment indicators and production indicators which are transmitted from the plurality of measurement sources A, B, C, and D and which serve as influencing factors when measuring the quality conditions of the part production steps and the finished product production steps.

Also, the IoT relay device 20 includes a function of generating measurement data EE in a standard format on the basis of the collected measurement data AA, BB, CC, and DD, and a function of generating indicator data FF in a standard format on the basis of the collected indicator data aa, bb, cc, and dd.

To request processing of the generated measurement data EE and indicator data FF in standard formats, the IoT relay device 20 additionally includes a function of transmitting the measurement data EE in a standard format and the indicator data FF in a standard format to the computing system 3 over the first communication network 5.

When transmitting the measurement data EE in a standard format and the indicator data FF in a standard format to the computing system 3 over the first communication network 5, the IoT relay device 20 additionally includes a gateway function that converts the communication protocol of the device network 2 to the Internet Protocol (IP) of the first communication network 5. In the measurement solution service providing system 1, things and the Internet are connected by this gateway function.

When the collected measurement data AA, BB, CC, and DD and the collected indicator data aa, bb, cc, and dd are identified as being in respectively different formats on the basis of information such as a preset flag, the IoT relay device 20 may also adopt a configuration including a function of converting the data into common-format data.

Figure 3A:
FIG. 3A is a diagram for explaining measurement data in a standard format in the system according to the embodiment.

As illustrated in the example of FIG. 3A, the measurement data EE in a standard format has a predetermined data length, and at least includes the predetermined fields of identification information (business user identification information) ID1 that specifies the cloud business user of the computing system 3, identification information (base identification information) ID2 that specifies the base corresponding to the manufacturing site, identification information (measurement source identification information) ID3 that specifies the measurement sources A, B, C, and D, the lot number LT for the measurement sources A, B, C, and D, the measurement value MV for the measurement sources A, B, C, and D, and measurement time information MT in YYYY/MM/DD, HH:MM, Weekday format, together with the measurement data flag F1.

Figure 3B:
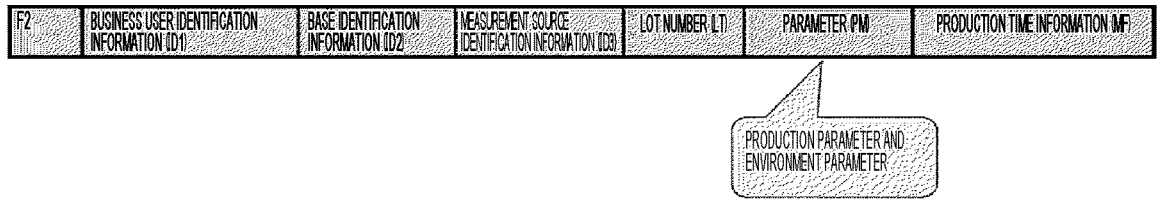
FIG. 3B is a diagram for explaining indicator data in a standard format in the system according to the embodiment.

Further, as illustrated in the example of FIG. 3B, the indicator data FF in a standard format has a predetermined data length, and at least includes the predetermined fields of identification information (business user identification information) ID1 that specifies the cloud business user of the computing system 3, identification information (base identification information) ID2 that specifies the base corresponding to the manufacturing site, identification information (measurement source identification information) ID3 that specifies the measurement sources A, B, C, and D, the lot number LT for the measurement sources A, B, C, and D, the production parameters PM and the environment parameters PM for the measurement sources A, B, C, and D, and production time information MF in YYYY/MM/DD, HH:MM, Weekday format, together with the indicator data flag F2.

In the measurement data EE in a standard format, the business user identification information ID1, the base identification information ID2, the measurement source identification information ID3, and the measurement time information MT are added when generating the measurement data EE in a standard format on the basis of the collected measurement data AA, BB, CC, and DD. Also, in the indicator data FF in a standard format, the business user identification information ID1, the base identification information ID2, the measurement source identification information ID3, and the production time information MF are added when generating the indicator data FF in a standard format on the basis of the collected indicator data aa, bb, cc, and dd. For example, the business user identification information ID1 and the base identification information ID2 are registered (stored) in advance in the memory (disk) of the IoT relay device 20 by the cloud business. The measurement source identification information ID3 can be generated on the basis of information such as the media access control (MAC) address of each of the measurement sources A, B, C, and D accommodated by the IoT relay device 20. The measurement time information MT and the production time information MF are generated on the basis of the total seconds (cumulative seconds) in the IoT relay device 20 or a reference time, and more strictly are collected (received) time information.

The measurement data EE in a standard format and the indicator data FF in a standard format are transmitted in real time to the computing system 3 in the form of an IP packet, along with added sender information SA that specifies the IoT relay device 20 and destination information DS that specifies the computing system 3 (not illustrated in FIGS. 3A and 3B).

As described in detail later, the measurement data EE in a standard format and the indicator data FF in a standard format transmitted from each IoT relay device 20 of each device network 2 and received in the computing system 3 are stored (accumulated) in a hierarchical structure that adopts a logical tree form in a measurement database DB1 and an indicator database DB2 of the computing system 3.

The IoT relay device 20 described above includes the following components as a hardware configuration. Namely, a central processing unit (CPU) is provided as a processor, random access memory (RAM) is provided as work memory, and read-only memory (ROM) storing a program for booting up is provided.

Also, the IoT relay device 20 is provided with component such as a disk configured as non-volatile flash memory that stores an operating system (OS), application programs, and various types of information (including data) so as to be rewritable, a communication controller, and a communication interface such as a network interface card (NIC). Because these hardware components are easily understood and implementable by persons skilled in the art, an illustration of the configuration is omitted.

To logically achieve each of the functions described above, a processing program is installed as an application program in the flash memory. Thereafter, when the IoT relay device 20 is powered on, the processor (CPU) causes the processing program to be resident in the RAM, and executes the processing program.

The computing system 3 is a cloud server computer that is maintained and managed by the cloud provider, and is provided with an IoT hub 31 and a SaaS cloud 32.

In the computing system 3, the IoT hub 31 is connected to a plurality of device networks 2 corresponding to a plurality of manufacturing sites of the cloud business user via the first communication network 5.

Generally, cloud services provided by a cloud computing system include software as a service (SaaS), platform as a service (PaaS), and infrastructure as a service (Iaas).

Here, a SaaS cloud service provides services up to application software (Applications) in the highest layer. A PaaS cloud service provides a platform suite of hardware, an operating system, and middleware for running application software. An IaaS cloud service provides infrastructure including hardware (CPU, storage) and an operating system.

Figure 4:
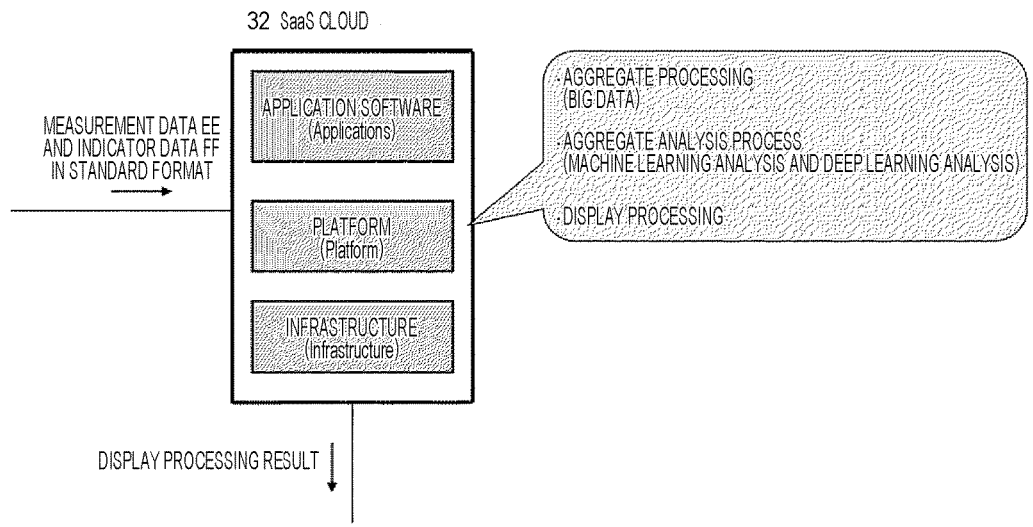
FIG. 4 is a diagram for explaining a SaaS cloud in the system according to the embodiment.

As illustrated in detail in FIG. 4, the computing system 3 adopts the SaaS cloud 32. The SaaS cloud 32 receives the measurement data EE in a standard format and the indicator data FF in a standard format transmitted in real time from each IoT relay device 20 via the first communication network 5 and the IoT hub 31. Additionally, the SaaS cloud 32 performs an aggregation process for generating big data from the received measurement data EE in a standard format and the indicator data FF in a standard format, and then performs an aggregate analysis process.

Also, the SaaS cloud 32 performs processing for displaying the results of the aggregate analysis process of the measurement data EE in a standard format and the indicator data FF in a standard format that has been subjected to an aggregation process for generating big data, and transmits the display processing result to the viewer terminal 4 over the second communication network 6. Note that in the computing system 3, to attain load distribution and function distribution of the SaaS cloud 32, the display processing result may also be transmitted to the viewer terminal 4 over the second communication network 6 from a web (World Wide Web) site.

As further described in detail, the measurement data EE in a standard format and the indicator data FF in a standard format transmitted from each IoT relay device 20 of each device network 2 and received in the computing system 3 are stored (accumulated) in a hierarchical structure that adopts a logical tree form, as illustrated in the example of FIGS. 5, 6, 7, and 8, in a measurement database DB1 and an indicator database DB2 by the aggregate processing of the SaaS cloud 32.

Figure 5:
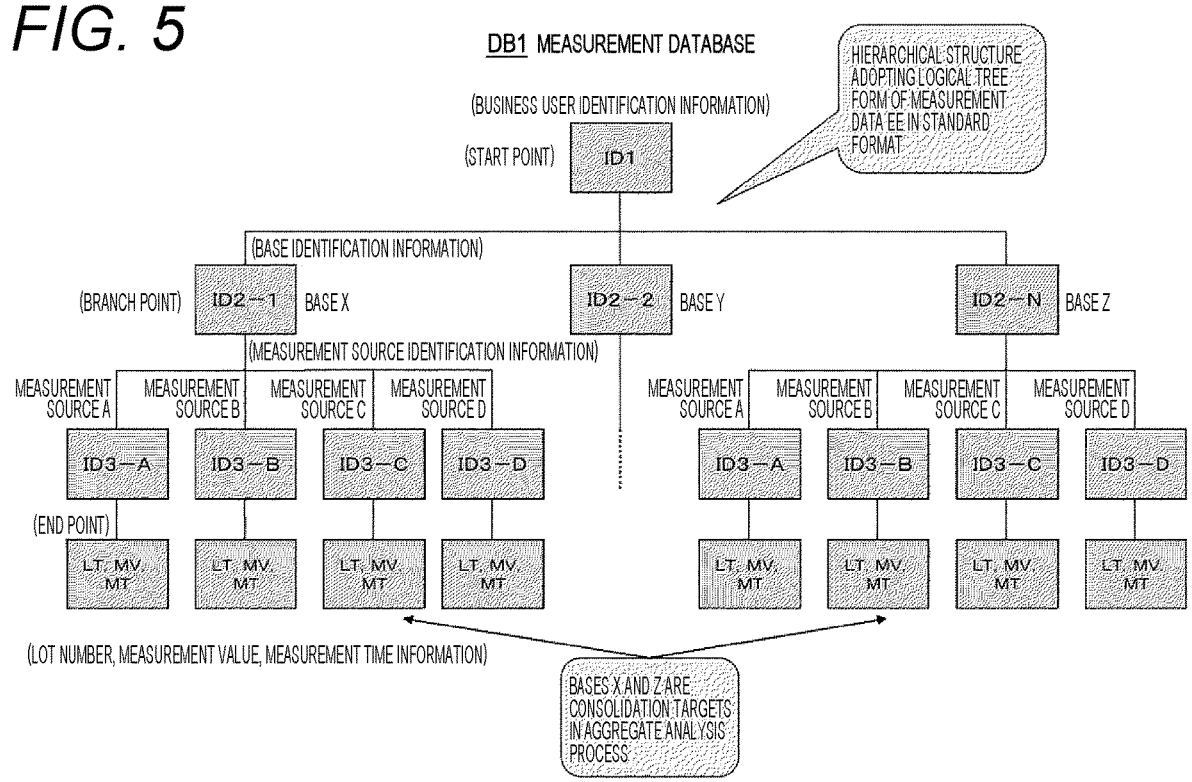
FIG. 5 is a diagram for explaining a hierarchical structure of measurement data in a standard format in a measurement database.

In other words, through the aggregation process of the received and identified measurement data EE in a standard format, the SaaS cloud 32 successively aggregates the lot number LT, the measurement value MV, and the measurement time information MT for the measurement sources A, B, C, and D at each base X, Y, and Z in correspondence with the hierarchy of the business user identification information ID1-base identification information ID2-measurement source identification information ID3 in the measurement database DB1 (see FIGS. 5 and 6). Likewise, through the aggregation process of the received and identified indicator data FF in a standard format, the SaaS cloud 32 successively aggregates the lot number LT, the parameters (production parameters and environment parameters) PM, and the production time information MF for the measurement sources A, B, C, and D at each base X, Y, and Z in correspondence with the hierarchy of the business user identification information ID1-base identification information ID2-measurement source identification information ID3 in the indicator database DB2 (see FIGS. 7 and 8). Note that in FIGS. 5, 6, 7, and 8, the illustration of a detailed configuration is omitted for the base Y, but the configuration is similar to that of the bases X and Z.

Consequently, the measurement data EE in a standard format and the indicator data FF in a standard format can each be thought of as a hierarchical structure that adopts the a logical tree form taking the business user identification information ID1 as a start point, the base identification information ID2 and the measurement source identification information ID3 as branch points, and either the lot number LT, the measurement value MV, and the measurement time information MT as end points or the lot number LT, the parameters PM, and the production time information MF as end points in the measurement database DB1 and the indicator database DB2.

When performing the aggregate analysis process on the measurement data EE and the indicator data FF in the measurement database DB1 and the indicator database DB2 that has been subjected to aggregation processing as big data, the SaaS cloud 32 executes the process by AI machine learning analysis and deep learning analysis according to information such as the relationships of the lot number LT, the measurement value MV, and the measurement time information MT or the lot number LT, the parameters PM, and the production time information MF for the measurement sources A, B, C, and D at each of the bases X, Y, and Z with finished products and parts. An abnormality prediction process by AI machine learning analysis and an optimal production condition provision process by AI deep learning analysis in the SaaS cloud 32 will be described in detail later.

Also, when performing the aggregate analysis process, the SaaS cloud 32 may consolidate the lot number LT, the measurement value MV, and the measurement time information MT or the lot number LT, the parameters PM, and the production time information MF for the measurement sources A, B, C, and D between the bases X, Y, and Z according to the relationships with finished products and parts, and then execute the process according to machine learning analysis and deep learning analysis. FIGS. 5 and 7 illustrate examples of respectively associating the lot number LT, the measurement value MV, and the measurement time information MT or the lot number LT, the parameters PM, and the production time information MF for finished products and parts in the measurement sources A, B, C, and D at the base X and the base Z as consolidation (integration) targets. Such a definition of consolidation between bases is specified in advance by the cloud business user in each IoT relay device 20, transmitted to the SaaS cloud 32, and preset in the measurement database DB1 and the indicator database DB2.

Next, the abnormality prediction process by AI machine learning analysis in the SaaS cloud 32 will be described first with reference to FIG. 9 and related diagrams.

The abnormality prediction process in the SaaS cloud 32 is based on an architecture that includes the following perspectives and processes. The abnormality prediction process is performed according to an advance instruction (for example, a periodic execution instruction) by the cloud business user.

[PSA1] Parameters that serve as factors of finished product characteristics (such as the quality, cost, and delivery/time of the finished product, for example) are part characteristics (such as the quality of the part, for example), and part characteristics can be grasped from part measurement data (such as the dimensions, weight, and hardness of the part, for example).

Herein, quality refers to the quality of the finished product or part, and refers to characteristics such as whether the demanded quality is provided, whether the functionality or performance set forth in the specifications is satisfied, and whether variations in error, yield, and properties are consistent. Cost refers to the costs or expenditures related to providing the finished product or part, and refers to characteristics such as whether sufficient measures for reducing these costs are being implemented. Delivery/time means delivery, turnover, or the like, generally refers to characteristics such as a deadline, time, or speed, and also refers to characteristics such as whether efforts to shorten the above are adequate.

[PSA2] Parts (for example, parts A, B, and C) to be supplied to a finished product (for example, finished product X) have different part characteristics depending on the lot (for example, lots LTA1, LTA2, and LTA3 of part A) even if the name of the part is the same. There may be anywhere from dozens to thousands of types of parts to be supplied to a finished product. Part measurement data is stored as values such as measurement values MVA1, MVA2, and MVA3 in correspondence with the lot number LT of each part in the measurement database DB1.

[PSA3] Characteristic tendencies appear in the finished product characteristics depending on the combination of these part types and part lots.

Correspondence relationships between finished product, part, and lot are recognized by the SaaS cloud 32 on the basis of association definitions (denoted by the * symbol as an example in FIG. 6) preset (preregistered) in the measurement database DB1. Correspondence relationships between finished product, part, and lot are specified in advance by the cloud business user in the IoT relay device 20, transmitted to the SaaS cloud 32, and preset as association definitions in the measurement database DB1.

For example, in the case where the parts to be supplied to the finished product X are the three parts A, B, and C, and each of the parts A, B, and C has three lots, namely the lots LTA1, LTA2, and LTA3 for the part A, the lots LTB1, LTB2, and LTB3 for the part B, and the lots LTC1, LTC2, and LTC3 for the part C, there are $3^3=27$ combinations (lots LTX1 to LTX27) of parts for the finished product X.

[PSA4] By using machine learning analysis to discover patterns between combinations of parts in the finished product X and the finished product characteristics, or in other words classify the characteristic tendencies, the kinds of characteristics exhibited by the finished product to be produced are predicted (estimated).

Specifically, by machine learning analysis, the characteristic tendencies, such as rising tendencies, outlier tendencies, volatile tendencies, or sporadic tendencies, are classified for the finished product X.

[PSA5] In the finished product production steps, finished product measurement data (such as the dimensions and weight of the finished product, for example) is monitored and cross-checked against patterned data to thereby determine whether or not the characteristics as the same as the predicted characteristics, and derive a tendency that would lead to abnormality.

The finished product measurement data is stored as measurement values MV1 to MV27 in correspondence with the lot number LT of each finished product in the measurement database DB1.

[PSA6] Additionally, in the case of a tendency that the finished product measurement data exceeds or diverges from a predetermined threshold, abnormality information is announced, and the cloud business user is notified through the viewer terminal 4.

[PSA7] The part characteristics are also influenced by the production parameters and the environment parameters, and are determined by the factors of the production parameters and the environment parameters for each lot.

[PSA8] The production parameters are the domain of 4M, and include information related to the production equipment used, the material (material supplier), the processing method, and the processor (worker/processing person). 4M may be subdivided further to include properties such as the rotational speed, the degree of runout from the center axis of rotation, and the condition of the blade (that is, how many workpieces the blade has been used on) of a processing machine that acts as production equipment. As more detailed data is accumulated, the accuracy of abnormality cause analysis improves.

Here, 4M refers to the four elements of production at a machining site: the man, the machine, the material, and the method. Quality management based on 4M makes it possible to attain an improved balance of QCD or QCT. Also, QCD refers to the critical factors in production management: quality, cost, and delivery. In some cases, the above is referred to as QCT, using time as a substitute for delivery.

[PSA9] The environment parameters are parameters that are not directly related to processing but still influence the production conditions, such as the temperature (° C.), the humidity (%), the pressure (air pressure/wind pressure (kPa)), and the work time period. Also, the environment parameters include information such as the expended time (including work, setup, and wait time), the expended subsidiary material, and the expended energy (including electricity, gas, water, and oil fees).

[PSA10] In manufacturing sites of the past, the cause-and-effect relationship between environment parameters and part characteristics has not been scrutinized closely, but revealing (visualizing) correlations with part characteristics leads to a clearer understanding of the causes of abnormality.

[PSA11] For these production parameters and environment parameters, by making association with each lot of parts and obtaining correlations with the part measurement data by machine learning, cause-and-effect relationships with the part characteristics can be discovered.

Correspondence relationships between lots of the parts, production parameters and environment parameters, and the part measurement data are recognized by the SaaS cloud 32 on the basis of association definitions (denoted by the * symbol as an example in FIGS. 6 and 8) preset (preregistered) in the indicator database DB2 and the measurement database DB1. These correspondence relationships are specified in advance by the cloud business user in the IoT relay device 20, transmitted to the SaaS cloud 32, and preset as association definitions in the indicator database DB2 and the measurement database DB1.

For example, in the case where the parts to be supplied to the finished product X are the three parts A, B, and C, the lot of the part A is LTA3, the lot of the part B is LTB1, and the lot of the part C is LTC2, the respective lots (LTA3, LTB1, and LTC2) of the parts A, B, and C are associated with the production parameters PM (PMA3 of part A=production equipment lot LTK3, material lot LTL3, processing method lot LTM3, processor lot LTN3; PMB1 of part B=production equipment lot LTK1, material lot LTL1, processing method lot LTM1, processor lot LTN1; PMC2 of part C=production equipment lot LTK2, material lot LTL2, processing method lot LTM2, processor lot LTN2) and the environment parameters PM (PMA3 of part A=temperature, humidity, pressure, and work time period lot LTQ3, expended time lot LTR3, expended subsidiary material and expended energy lot LTS3; PMB1 of part B=temperature, humidity, pressure, and work time period lot LTQ1, expended time lot LTR1, expended subsidiary material and expended energy lot LTS1; PMC2 of part C=temperature, humidity, pressure, and work time period lot LTQ2, expended time lot LTR2, expended subsidiary material and expended energy lot LTS2), and the part measurement data (measurement value MVA3 of part A, measurement value MVB1 of part B, and measurement value MVC2 of part C). The SaaS cloud 32 obtains this correspondence relationship by referencing the indicator database DB2 and the measurement database DB1 with preset associations.

[PSA12] The production parameters and the environment parameters also influence the characteristics of the finished product even in the finished product production steps.

[PSA13] The finished product characteristics are determined by the combination of the part characteristics and the production and environment parameters in the finished product production steps. The cause of an abnormality in the finished product characteristics is derived from the above production parameters and the above environment parameters of the parts (here, the parts A, B, and C), and the production and environment parameters of the finished product (finished product X).

The production parameters and environment parameters of the finished product are parameters PMX11 corresponding to the lot LTX11 of the finished product X. The parameters PMX11 include the production equipment, the material, the processing method, and the processor as the production parameters. Also, the parameters PMX11 include the temperature, the humidity, the pressure, the work time period, the expended time, the expended subsidiary material, and the expended energy as the environment parameters.

As described above, in the abnormality prediction process, by utilizing machine learning analysis, the SaaS cloud 32 is capable of notifying the viewer terminal 4 of (visually displaying) an analysis process result (abnormality prediction result for a produced finished product containing produced parts.

In other words, in the abnormality prediction process, the SaaS cloud 32 provides information such as a prediction of the occurrence of an abnormality in one or more steps (finished product production steps and/or part production steps), an estimation of the cause of the abnormality in the step(s), and countermeasures for the abnormality in the step(s) as a measurement solution server to the cloud business user through the viewer terminal 4.

Specifically, the SaaS cloud 32, for example, in the case where the dimension of the measurement value MVX11 corresponding to the lot LTX11 of the finished product X exhibits a volatile tendency diverging from a predetermined threshold, predicts the occurrence of an abnormality in the finished product production step and/or the part production steps (this lot has large variations and step performance is reduced), estimates the cause of the abnormality in the step(s), and notifies the cloud business user through the viewer terminal 4 of a countermeasure for the abnormality in the step(s) (The chuck of the processing machine may be biased. Please inspect the tightness of the chuck immediately.) together with a graph including time information indicating the volatile tendency.

Also, the SaaS cloud 32, for example, in the case where the temperature of the parameters (environment parameters) PMX11 corresponding to the lot LTX11 of the finished product X exhibits a rising tendency that exceeds a predetermined threshold, predicts the occurrence of an abnormality in the finished product production steps (an upper limit value will be exceeded in 15 minutes), estimates the cause of the abnormality in the step (a rise in the room temperature), and notifies the cloud business user through the viewer terminal 4 of a countermeasure for the abnormality in the step (Please keep the room temperature at 25° C. or less immediately) together with a graph including time information indicating the rising tendency.

Figure 10:
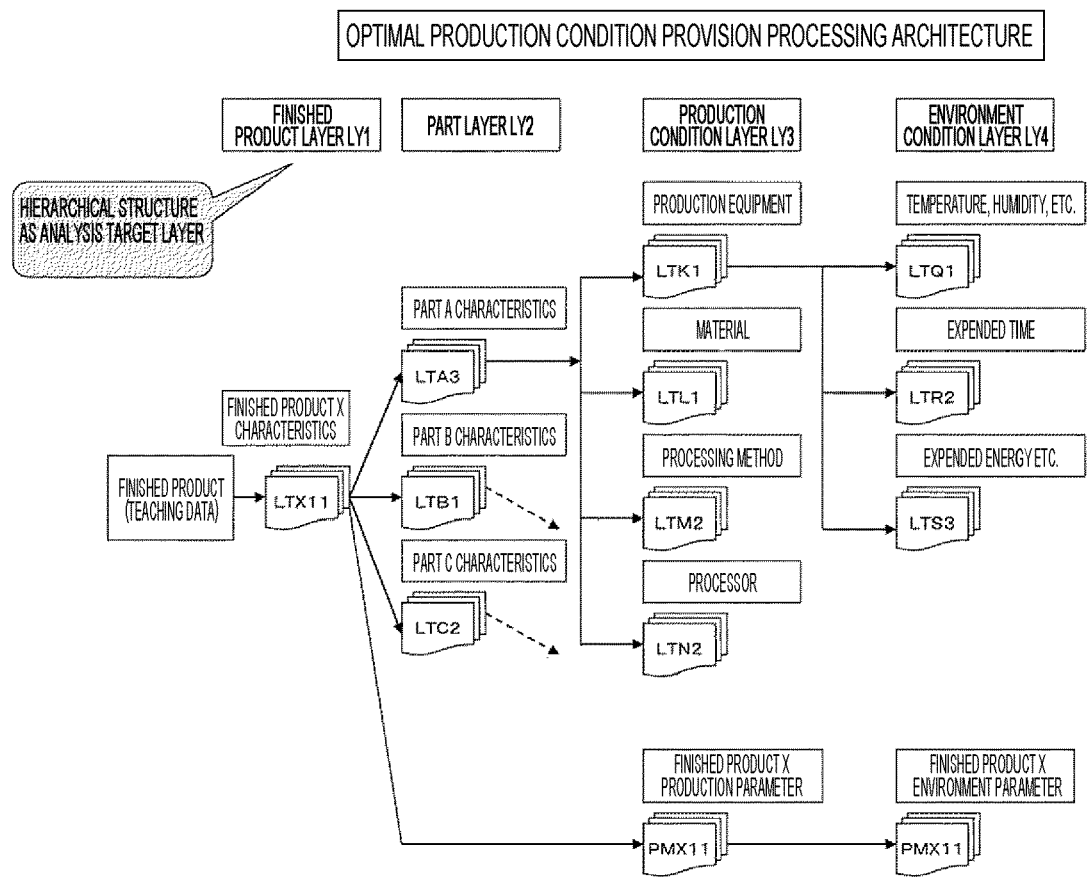
FIG. 10 is a diagram for explaining an optimal production condition provision processing architecture in the system according to the embodiment.
Figure 11:
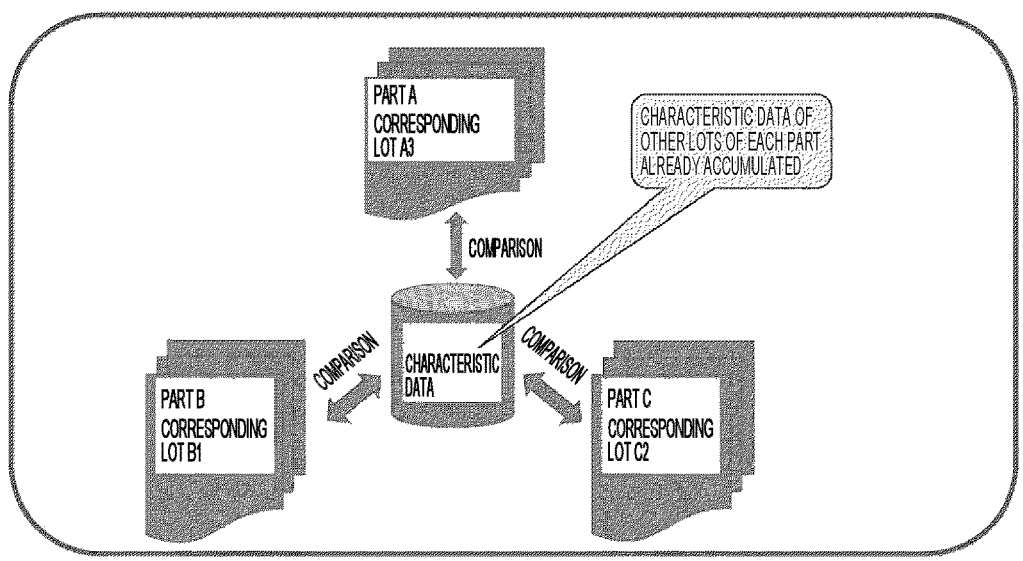
FIG. 11 is a diagram for explaining a process for deriving a part characteristic pattern in the system according to the embodiment.

Next, the optimal production condition provision process (optimal influencing factor condition provision process) by AI deep learning analysis in the SaaS cloud 32 will be described with reference to FIG. 10, FIG. 11, and related diagrams.

The optimal production condition provision process in the SaaS cloud 32 is based on an architecture that includes the following perspectives and processes. The optimal production condition provision process is performed according to an execution instruction of any type from the cloud business user.

[PSB1] Teaching data (known, desirable model data) is given as characteristic data about the finished product (for example, the finished product X).

[PSB2] The analysis target layers contain four layers (multiple layers) including a finished product layer LY1, a part layer LY2, a production condition layer LY3, and an environment condition layer LY4. In these four-layer analysis target layers, in the case of setting the finished product layer LY1 as the start point of analysis, the part layer LY2, the production condition layer LY3, and the environment condition layer LY4 adopt a hierarchical structure together with the finished product layer LY1.

Characteristic data for each of the finished product layer LY1, the part layer LY2, the production condition layer LY3, and the environment condition layer LY4 can be obtained from the relevant items in the measurement database DB1 and the indicator database DB2.

[PSB3] On the basis of the teaching data (for example, dimensions) for the finished product, the lot of the finished product (for example, the lot LTX11 of the finished product X) having similar (resembling) characteristic data is extracted from the finished product layer LY1.

[PSB4] The lots of parts (for example, the lot LTA3 of the part A, the lot LTB1 of the part B, and the lot LTC2 of the part C) related to the extracted lot of the finished product (herein, the lot LTX11 of the finished product X), or in other words forming the finished product X, are extracted from the part layer LY2.

[PSB5] From the characteristic data (herein, the dimensions) of the extracted lots of the parts (herein, the lot LTA3 of the part A, the lot LTB1 of the part B, and the lot LTC2 of the part C), a part characteristic pattern in accordance with the teaching data of the finished product is derived.

To derive the part characteristic pattern, the comparison process indicated next is performed. Namely, in the comparison process, first, the characteristic data (measurement data) of the extracted lot of each part related to the lot of the finished product is compared against the characteristic data of other lots of each part already accumulated in the measurement database DB1. Next, features of commonality and deviation (difference) are extracted for each part lot. Additionally, when it is determined that deviation exists in an extracted feature, the part lot (herein, the lot LTA3 of the part A, the lot LTB1 of the part B, and/or the lot LTC2 of the part C) is set as the analysis target for providing optimal influencing factor conditions to be improved. Note that the reason why a part lot is set as an analysis target even if it is determined that the extracted features have commonality is to obtain optimal influencing factor conditions by which the commonality is maintained (see FIG. 11).

In the results of such a process of deriving a part characteristic pattern, for the lots of the parts A, B, and C forming the finished product X (herein, the lot LTA3 of the part A, the lot LTB1 of the part B, and the lot LTC2 of the part C), the error ranges of dimensions such as the outer diameter, the inner diameter, and the height of the parts A, B, and C can be estimated, for example.

[PSB6] For an extracted lot of a part (for example, the lot LTA3 of the part A), the lots of the conditions of the production equipment, the material, the processing method, and the processor used at the time (for example, the production equipment lot LTK1, the material lot LTL1, the processing method lot LTM2, and the processor lot LTN2) are extracted from the production condition layer LY3.

[PSB7] On the basis of the extracted characteristic data (for example, the production equipment) from the production condition layer LY3, QCD optimal production conditions in accordance with the part characteristic pattern derived in [PSB5] are derived. To derive the optimal production conditions, a process similar to the comparison process for the part characteristic pattern described above is performed. Namely, in the comparison process, first, the characteristic data (indicator data) of the extracted lot of each production condition related to the lot of the part is compared against the characteristic data of other lots of each production condition already accumulated in the indicator database DB2. Next, features of commonality and deviation (difference) are extracted for each production condition lot. The commonality or deviation in the extracted features is then determined.

In the results of such a process of deriving optimal production conditions, for the lots of the parts A, B, and C forming the finished product X (herein, the lot LTA3 of the part A, the lot LTB1 of the part B, and the lot LTC2 of the part C), the outcomes of the production equipment, the material, the processing method, and the processor for the parts A, B, and C (for example, an improvement of Y seconds in lead time or an improvement of Y % in output) can be respectively estimated, for example.

[PSB8] For a lot corresponding to an item in the production condition layer LY3 extracted in [PSB6] above (herein, the production equipment lot LTK1), the lots of the temperature, humidity, pressure, and work time period, expended time, and expended subsidiary material and expended energy (for example, the temperature, humidity, pressure, and work time period lot LTQ1, the expended time lot LTR2, and the expended subsidiary material and expended energy lot LTS3) are extracted from the environment condition layer LY4.

[PSB9] For a lot corresponding to each item in the environment condition layer LY4 extracted in [PSB8] above (herein, the temperature, humidity, pressure, and work time period lot LTQ1, the expended time lot LTR2, and the expended subsidiary material and expended energy lot LTS3), QCD optimal environment conditions in accordance with the production conditions in [PSB7] above are derived. To derive the QCD optimal environment conditions, a process similar to the comparison process for the part characteristic pattern described above is performed. Namely, in the comparison process, first, the characteristic data (indicator data) of the extracted lot of each environment condition related to the lot of the production equipment is compared against the characteristic data of other lots of each environment condition already accumulated in the indicator database DB2. Next, features of commonality and deviation (difference) are extracted for each environment condition lot. The commonality or deviation in the extracted features is then determined.

In the results of such a process of deriving optimal environment conditions, for the lots of the parts A, B, and C forming the finished product X (herein, the lot LTA3 of the part A, the lot LTB1 of the part B, and the lot LTC2 of the part C), the outcomes of conditions such as the temperature (room temperature), the work time period, and the expended energy for the production equipment of the parts A, B, and C (for example, a dimensional error of Y μm or less, an improvement of Y seconds in the cycle time, or a reduction in the amount of power used) can be respectively estimated, for example.

[PSB10] In the finished product production steps, the production conditions in the production condition layer LY3 and the environment conditions in the environment condition layer LY4 are derived on the basis of the lot of the finished product (herein, the lot LTX11 of the finished product X) extracted in [PSB3] above.

In other words, by referencing the measurement database DB1 and the indicator database DB2, the SaaS cloud 32 extracts production conditions (parameters PMX11) and environment conditions (parameters PMX11) corresponding to the lot LTX11 of the finished product X, and performs a process of deriving optimal production conditions and optimal environment conditions. To derive the optimal production conditions and optimal environment conditions, a process similar to the comparison process for the part characteristic pattern described above is performed.

[PSB11] The values of the optimal production conditions and environment conditions described above are provided for each item in the production conditions of the finished product and the environment conditions of the finished product, and furthermore for each item in the characteristics of the parts, the production conditions of the parts, and the environment conditions of the parts. The greater the number of production condition items, environment condition items, and accumulated data, the higher the accuracy of the provided information about the optimal production conditions and environment conditions becomes.

[PSB12] In the case where teaching data for the parts is given instead of teaching data for the finished product X, optimal production conditions and environment conditions can be derived similarly on the basis of the extraction of the part characteristics. In this case, the part layer LY2 becomes the start point of analysis, while the characteristic data in the finished product layer LY1, the production conditions of the finished product, and the environment conditions of the finished product are not involved.

[PSB13] It is also possible to simulate the finished product characteristics from not only teaching data of the finished product but also data about the characteristics of parts, the production conditions of parts, or the environment conditions of parts. With this arrangement, origin management can also be performed.

As described above, by utilizing deep learning analysis in the optimal production condition provision process, the SaaS cloud 32 is capable of notifying the viewer terminal 4 of (visually displaying) the production conditions and the environment conditions for which the QCD or QCT balance is optimal (maximized) as an analysis processing result for the finished product to be produced that includes the parts to be produced.

In other words, in the optimal production condition provision process, the SaaS cloud 32 is capable of providing the production conditions and environment conditions having the maximum production effects on the steps (finished product production steps and/or part production steps), or in other words optimal influencing factor conditions, as a measurement solution service to the cloud business user through the viewer terminal 4.

As described above, the SaaS cloud 32 of the computing system 3 includes an aggregate processing function that receives the measurement data EE and the indicator data FF transmitted from the IoT relay device 20 through the communication network 5, and aggregates the received measurement data and the received indicator data into a measurement database DB1 and an indicator database DB2 for generating big data, a first analyzing function that analyzes both the measurement data and the indicator data as the big data aggregated in the measurement database DB1 and the indicator database DB2 by classifying and cross-checking characteristic tendencies according to machine learning for each lot of a finished product and a part pre-associated with each other, and predicts an abnormality, and a second analyzing function that analyzes both the measurement data and the indicator data as the big data aggregated in the measurement database DB1 and the indicator database DB2 by deep learning that treats a hierarchical structure as analysis target layers for each lot of a part or for each lot of a finished product and a part pre-associated with each other, and computes an optimal influencing factor condition, and a first display processing function that displays and processes an abnormality prediction result from the first analyzing function for transmission to a viewer terminal 4, and a second display processing function that displays and processes an optimal influencing factor condition computed by the second analyzing function for transmission to the viewer terminal 4.

To logically achieve each of the functions described above in the SaaS cloud 32, a processing program is installed as an application program in the flash memory. Thereafter, when the SaaS cloud 32 is powered on, the processor (CPU) causes the processing program to be resident in the RAM, and executes the processing program. The measurement database DB1 and the indicator database DB2 are configured in a flash memory.

The viewer terminal 4 is a terminal having a web browser, such as a personal computer PC, a smartphone SP, or a tablet TB, and is used by a viewer of the cloud business user.

The viewer terminal 4 includes a function of receiving the display processing result from the computing system 3 over the second communication network 6, and a function of displaying the received display processing result. The viewer of the cloud business user is able to grasp the quality conditions in each step at each base on the basis of the display processing result displayed on the viewer terminal 4, and take necessary countermeasures.

The hardware configuration of the viewer terminal 4 can be easily understood and implemented by a person skilled in the art, therefore, illustration and description thereof are omitted. In the viewer terminal 4, to logically achieve each of the functions described above, a processing program is installed as an application program in the flash memory. Thereafter, when the viewer terminal 4 is powered on or when the viewer instructs, the processor (CPU) causes the processing program to be loaded in the RAM, and executes the processing program.

[Measurement Solution Service Provision Process]

Next, operations in the measurement solution service providing system 1 described above will be described with reference to FIG. 12 and related diagrams.

Figure 12:
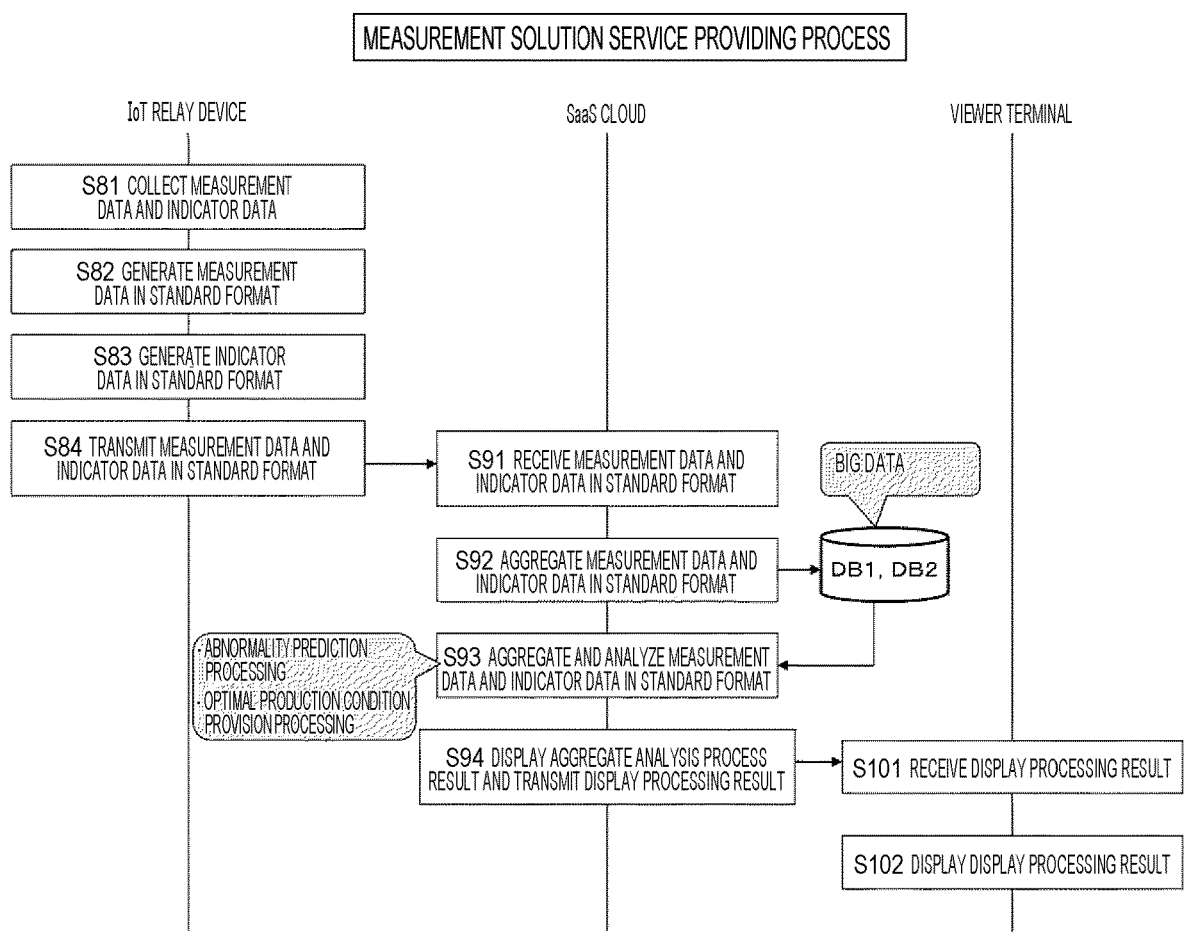
FIG. 12 is a sequence diagram for explaining a measurement solution service providing process in the system according to the embodiment.

FIG. 12 illustrates an example of a sequence of a measurement solution service provision process that includes the abnormality prediction process and the optimal production condition provision process in the measurement solution service providing system 1 described above. Note that in the following description, the interposition of the communication networks 5 and 6 and the IoT hub 31 will be omitted unless the description becomes unclear.

When each IoT relay device 20 is powered on, a processing program is launched, and the processor (CPU) executes the processes described next.

[Process S81 (see FIG. 12)] The measurement data AA, BB, CC, and DD and the indicator data aa, bb, cc, and dd transmitted from the plurality of measurement sources A, B, C, and D are collected.

[Process S82] The measurement data EE in a standard format is generated on the basis of the collected measurement data AA, BB, CC, and DD. When generating the measurement data EE in a standard format, the business user identification information ID1, the base identification information ID2, the measurement source identification information ID3, and the measurement time information MT are added.

[Process S83] The indicator data FF in a standard format is generated on the basis of the collected indicator data aa, bb, cc, and dd. When generating the indicator data FF in a standard format, the business user identification information ID1, the base identification information ID2, the measurement source identification information ID3, and the production time information MF are added.

[Process S84] The measurement data EE in a standard format and the indicator data FF in a standard format are transmitted to the computing system 3. When transmitting the measurement data EE and the indicator data FF, the communication protocol is converted to the IP protocol.

Further, when the SaaS cloud 32 of the computing system 3 is powered on, a processing program is launched, and the processor (CPU) executes the processes described next.

[Process S91 (see FIG. 12)] The measurement data EE in a standard format and the indicator data FF in a standard format are received from each IoT relay device 20.

[Process S92] The received measurement data EE in a standard format and the indicator data FF in a standard format are aggregated into a hierarchical structure in the measurement database DB1 and the indicator database DB2, respectively.

[Process S93] The aggregated measurement data EE and indicator data FF is subjected to the aggregate analysis process for each lot. In the aggregate analysis process, at least one of the abnormality prediction process and the optimal production condition provision process is performed according to an execution instruction from the cloud business user.

[Process S94] The result of the aggregate analysis process is processed for display, and the display processing result is transmitted to the viewer terminal 4.

Further, when the viewer terminal 4 is powered on, a processing program is launched, and the processor (CPU) executes the processes described next.

[Process S101 (see FIG. 12)] The display processing result is received from the computing system 3.

[Process S102] The received display processing result is displayed.

Effect of Embodiment

The measurement solution service providing system 1 according to an embodiment described above, by linking IoT technology, cloud computing technology, and AI technology, accumulates measurement data EE in a standard format and indicator data FF in a standard format for generating big data in the computing system 3 and performs an aggregate analysis process and a display process, so as to provide a revolutionary measurement solution service making it possible to grasp, anytime and anywhere, the quality conditions in each step at a manufacturing base (site) to the cloud business user.

Also, in the measurement solution service providing system 1, because the computing system 3 processes the measurement data EE in a standard format and the indicator data FF in a standard format transmitted from each of the plurality of IoT relay devices 20 disposed in each base, the load on the application software of the SaaS cloud 32 can be reduced, and the processing performance can be raised.

Further, in the measurement solution service providing system 1, the computing system 3 utilizes AI machine learning analysis so as to be able to notify the viewer terminal 4 of (visually displaying) an abnormality prediction result for a produced finished product containing produced parts.

Furthermore, in the measurement solution service providing system 1, by utilizing AI deep learning analysis, the computing system 3 is capable of notifying the viewer terminal 4 of (visually displaying) the production conditions and the environment conditions for which the QCD or QCT balance is optimal (maximized) as an analysis processing result for the finished product to be produced that includes the parts to be produced.

[Modifications]

In the measurement solution service providing system 1 according to the embodiment described above, the computing system 3 is a cloud server computer that is maintained and managed by the cloud provider, and takes a configuration provided with the IoT hub 31 and the SaaS cloud 32, but is not limited thereto. In other words, the computing system 3 may also be a server computer maintained and managed by an entity such as an Internet service provider (ISP), and take a configuration provided with an information processing device instead of the SaaS cloud 32. In this case, the measurement solution service providing system 1 is a system combining IoT technology and AI technology.

The processes in the embodiment described above may be provided as a program executable by a computer, which is providable through a non-transitory computer-readable recording medium such as a CD-ROM disc or a flexible disk, and which is furthermore providable through a communication channel.

Additionally, a selective combination of any or all of the processes in the embodiment described above may also carried out.

DESCRIPTION OF THE REFERENCE NUMERALS 1 measurement solution service providing system
2 device network
3 computing system
4 viewer terminal
5 first communication network
6 second communication network
20 Iot relay device
21A indicator detector
21B indicator detector
21C indicator detector
21D indicator detector
22A measuring instrument
22B measuring instrument
22C measuring instrument
22D measuring instrument
23A wireless transmitter
23B wireless transmitter
23C wireless transmitter
23D wireless transmitter
24 wireless receiver
31 IoT hub
32 SaaS cloud
DB1 measurement database
DB2 indicator database

The invention claimed is:

1. A measurement solution service providing system comprising:
   an IoT relay device configured to collect measurement data transmitted from a plurality of measurement sources that is distributively arranged in each process in a base corresponding to a manufacturing site and that measures quality conditions in a finished product production process and a part production process, and indicator data that is transmitted from the plurality of measurement sources and that includes an environment indicator and a production indicator acting as influencing factors when measuring the quality conditions; and
   a computing system configured to;
   receive the measurement data and the indicator data transmitted from the IoT relay device, and aggregate the received measurement data and the received indicator data into a measurement database and an indicator database for generating big data,
   analyze both the measurement data and the indicator data as the big data aggregated in the measurement database and the indicator database by deep learning that treats a three-layer serial hierarchical structure containing a production condition layer and an environment condition layer as a start point for analysis of a part layer as analysis target layers for each lot of a part, or analyze both the measurement data and the indicator data by the deep learning that treats a four-layer serial hierarchical structure containing a part layer, a production condition layer, and an environment condition layer as a start point for analysis of a finished product layer as analysis target layers for each lot of a finished product and a part pre-associated with each other, and compute an optimal influencing factor condition, and
   display and process the optimal influencing factor condition computed by the analyzing for transmission to a viewer terminal,
   wherein the computing system aggregates the received measurement data and the received indicator data in a hierarchical structure that takes a logical tree form including a start point, branch points, and end points in the measurement database and the indicator database, respectively, and associates the start point with identification information that specifies a business user of the computing system, and
   the computing system analyzes both the measurement data and the indicator data as the big data aggregated in the measurement database and the indicator database by the deep learning for each lot of the part or for each lot of the finished product and the part pre-associated with each other, and also for each consolidation target between bases subordinate to the same start point corresponding to the identification information that specifies the business user of the computing system.

2. A measurement solution service providing system comprising:
   an IoT relay device configured to collect measurement data transmitted from a plurality of measurement sources that is distributively arranged in each process in a base corresponding to a manufacturing site and that measures quality conditions in a finished product production process and a part production process, and indicator data that is transmitted from the plurality of measurement sources and that includes an environment indicator and a production indicator acting as influencing factors when measuring the quality conditions; and
   a computing system configured to;
   receive the measurement data and the indicator data transmitted from the IoT relay device, and aggregate the received measurement data and the received indicator data into a measurement database and an indicator database for generating big data,
   analyze both the measurement data and the indicator data as the big data aggregated in the measurement database and the indicator database by classifying and cross-checking characteristic tendencies according to machine learning for each lot of a finished product and a part pre-associated with each other, and predict an abnormality,
   analyze both the measurement data and the indicator data as the big data aggregated in the measurement database and the indicator database by deep learning that treats a three-layer serial hierarchical structure containing a production condition layer and an environment condition layer as a start point for analysis of a part layer as analysis target layers for each lot of a part, or analyze both the measurement data and the indicator data by the deep learning that treats a four-layer serial hierarchical structure containing a part layer, a production condition layer, and an environment condition layer as a start point for analysis of a finished product layer as analysis target layers for each lot of a finished product and a part pre-associated with each other, and compute an optimal influencing factor condition, display and process an abnormality prediction result for transmission to a viewer terminal, and display and process the optimal influencing factor condition computed for transmission to the viewer terminal, wherein the computing system aggregates the received measurement data and the received indicator data in a hierarchical structure that takes a logical tree form including a start point, branch points, and end points in the measurement database and the indicator database, respectively, and associates the start point with identification information that specifies a business user of the computing system, the machine learning of the computing system analyzes both the measurement data and the indicator data as the big data aggregated in the measurement database and the indicator database by the machine learning for each lot of the finished product and the part pre-associated with each other, and also for each consolidation target between bases subordinate to the same start point corresponding to the identification information that specifies the business user of the computing system, and the deep learning of the computing system analyzes both the measurement data and the indicator data as the big data aggregated in the measurement database and the indicator database by the deep learning for each lot of the part or for each lot of the finished product and the part pre-associated with each other, and also for each consolidation target between the bases subordinate to the same start point corresponding to the identification information that specifies the business user of the computing system.

3. The measurement solution service providing system according to claim 1, wherein a plurality of the IoT relay devices is each disposed at each base.

4. The measurement solution service providing system according to claim 1, wherein the production indicator includes at least one from among information related to production equipment, a material, a processing method, and a processing person used at each of the plurality of measurement sources as a parameter.

5. The measurement solution service providing system according to claim 1, wherein the environment indicator includes at least one from among information related to a temperature, a humidity, a pressure, and a work time period at each of the plurality of measurement sources as a parameter.

6. The measurement solution service providing system according to claim 1, wherein the IoT relay device is further configured to;

generate measurement data in a standard format on a basis of the collected measurement data, generate indicator data in a standard format on a basis of the collected indicator data, and transmit the measurement data in the standard format and the indicator data in the standard format to the computing system through a communication network to request processing of the generated measurement data and indicator data in the standard format.

7. The measurement solution service providing system according to claim 1, wherein the measurement data includes at least identification information that specifies a business user of the computing system, identification information that specifies the base corresponding to the manufacturing site, identification information that specifies the measurement source, a lot number of the finished product or the part to be measured at the measurement source, a measurement value of the finished product or the part to be measured at the measurement source, and measurement time information as predetermined items.

8. The measurement solution service providing system according to claim 7, wherein the measurement data is aggregated into the measurement database in a hierarchical structure that adopts a logical tree form taking the identification information that specifies the business user of the computing system as a start point, the identification information that specifies the base corresponding to the manufacturing site and the identification information that specifies the measurement source as branch points, and the lot number and the measurement value at the measurement source and the measurement time information as end points.

9. The measurement solution service providing system according to claim 1, wherein the indicator data includes at least identification information that specifies a business user of the computing system, identification information that specifies the base corresponding to the manufacturing site, identification information that specifies the measurement source, a lot number of the finished product or the part to be measured at the measurement source, a production indicator and an environment indicator at the measurement source, and production time information as predetermined items.

10. The measurement solution service providing system according to claim 9, wherein the indicator data is aggregated into the indicator database in a hierarchical structure that adopts a logical tree form taking the identification information that specifies the business user of the computing system as a start point, the identification information that specifies the base corresponding to the manufacturing site and the identification information that specifies the measurement source as branch points, and the lot number, the production indicator and the environment indicator at the measurement source, and the production time information as end points.

11. The measurement solution service providing system according to claim 1, wherein each of the plurality of measurement sources includes a measuring instrument and an indicator detector, the computing system includes a SaaS cloud, and the IoT relay device is an IoT gateway.

12. A measurement solution service providing method comprising:

by an IoT relay device, processing;

collecting measurement data transmitted from a plurality of measurement sources that is distributively arranged in each process in a base corresponding to a manufacturing site and that measures quality conditions in a finished product production process and a part production process, and indicator data that is transmitted from the plurality of measurement sources and that includes an environment indicator and a production indicator acting as influencing factors when measuring the quality conditions, by a computing system, processing;

receiving the measurement data and the indicator data transmitted from the IoT relay device, and aggregating the received measurement data and the received indicator data into a measurement database and an indicator database for generating big data, analyzing both the measurement data and the indicator data as the big data aggregated in the measurement database and the indicator database by deep learning that treats a three-layer serial hierarchical structure containing a production condition layer and an environment condition layer as a start point for analysis of a part layer as analysis target layers for each lot of a part, or analyzing both the measurement data and the indicator data by the deep learning that treats a four-layer serial hierarchical structure containing a part layer, a production condition layer, and an environment condition layer as a start point for analysis of a finished product layer as analysis target layers for each lot of a finished product and a part pre-associated with each other, and computing an optimal influencing factor condition, and displaying and processing the computed optimal influencing factor condition for transmission to a viewer terminal, wherein the computing system aggregates the received measurement data and the received indicator data in a hierarchical structure that takes a logical tree form including a start point, branch points, and end points in the measurement database and the indicator database, respectively, and associates the start point with identification information that specifies a business user of the computing system, and the computing system analyzes both the measurement data and the indicator data as the big data aggregated in the measurement database and the indicator database by the deep learning for each lot of the part or for each lot of the finished product and the part pre-associated with each other, and also for each consolidation target between bases subordinate to the same start point corresponding to the identification information that specifies the business user of the computing system.

13. A measurement solution service providing method comprising:

by an IoT relay device, processing;

collecting measurement data transmitted from a plurality of measurement sources that is distributively arranged in each process in a base corresponding to a manufacturing site and that measures quality conditions in a finished product production process and a part production process, and indicator data that is transmitted from the plurality of measurement sources and that includes an environment indicator and a production indicator acting as influencing factors when measuring the quality conditions, by a computing system, processing;

receiving the measurement data and the indicator data transmitted from the IoT relay device, and aggregating the received measurement data and the received indicator data into a measurement database and an indicator database for generating big data, analyzing both the measurement data and the indicator data as the big data aggregated in the measurement database and the indicator database by classifying and cross-checking characteristic tendencies according to machine learning for each lot of a finished product and a part pre-associated with each other, and predicting an abnormality, analyzing both the measurement data and the indicator data as the big data aggregated in the measurement database and the indicator database by deep learning that treats a three-layer serial hierarchical structure containing a production condition layer and an environment condition layer as a start point for analysis of a part layer as analysis target layers for each lot of a part, or analyzing both the measurement data and the indicator data by the deep learning that treats a four-layer serial hierarchical structure containing a part layer, a production condition layer, and an environment condition layer as a start point for analysis of a finished product layer as analysis target layers for each lot of a finished product and a part pre-associated with each other, and computing an optimal influencing factor condition, displaying and processing a result of the abnormality prediction for transmission to a viewer terminal, and displaying and processing the computed optimal influencing factor condition for transmission to the viewer terminal, wherein the computing system aggregates the received measurement data and the received indicator data in a hierarchical structure that takes a logical tree form including a start point, branch points, and end points in the measurement database and the indicator database, respectively, and associates the start point with identification information that specifies a business user of the computing system, the machine learning of the computing system analyzes both the measurement data and the indicator data as the big data aggregated in the measurement database and the indicator database by the machine learning for each lot of the finished product and the part pre-associated with each other, and also for each consolidation target between bases subordinate to the same start point corresponding to the identification information that specifies the business user of the computing system, and the deep learning of the computing system analyzes both the measurement data and the indicator data as the big data aggregated in the measurement database and the indicator database by the deep learning for each lot of the part or for each lot of the finished product and the part pre-associated with each other, and also for each consolidation target between the bases subordinate to the same start point corresponding to the identification information that specifies the business user of the computing system.

14. A computing system cooperating with an IoT relay device configured to collect measurement data transmitted from a plurality of measurement sources that is distributively arranged in each process in a base corresponding to a manufacturing site and that measures quality conditions in a finished product production process and a part production process, and indicator data that is transmitted from the plurality of measurement sources and that includes an environment indicator and a production indicator acting as influencing factors when measuring the quality conditions, the computing system configured to:

receive the measurement data and the indicator data transmitted from the IoT relay device, and aggregate the received measurement data and the received indicator data into a measurement database and an indicator database for generating big data;

analyze both the measurement data and the indicator data as the big data aggregated in the measurement database and the indicator database by deep learning that treats a three-layer serial hierarchical structure containing a production condition layer and an environment condition layer as a start point for analysis of a part layer as analysis target layers for each lot of a part, or analyze both the measurement data and the indicator data by the deep learning that treats a four-layer serial hierarchical structure containing a part layer, a production condition layer, and an environment condition layer as a start point for analysis of a finished product layer as analysis target layers for each lot of a finished product and a part pre-associated with each other, and computing an optimal influencing factor condition; and display and process the optimal influencing factor condition computed by the analyzing for transmission to a viewer terminal, wherein the computing system aggregates the received measurement data and the received indicator data in a hierarchical structure that takes a logical tree form including a start point, branch points, and end points in the measurement database and the indicator database, respectively, and associates the start point with identification information that specifies a business user of the computing system, and the computing system analyzes both the measurement data and the indicator data as the big data aggregated in the measurement database and the indicator database by the deep learning for each lot of the part or for each lot of the finished product and the part pre-associated with each other, and also for each consolidation target between bases subordinate to the same start point corresponding to the identification information that specifies the business user of the computing system.

15. A computing system cooperating with an IoT relay device configured to collect measurement data transmitted from a plurality of measurement sources that is distributively arranged in each process in a base corresponding to a manufacturing site and that measures quality conditions in a finished product production process and a part production process, and indicator data that is transmitted from the plurality of measurement sources and that includes an environment indicator and a production indicator acting as influencing factors when measuring the quality conditions, the computing system configured to:

receive the measurement data and the indicator data transmitted from the IoT relay device, and aggregate the received measurement data and the received indicator data into a measurement database and an indicator database for generating big data;

analyze both the measurement data and the indicator data as the big data aggregated in the measurement database and the indicator database by classifying and cross-checking characteristic tendencies according to machine learning for each lot of a finished product and a part pre-associated with each other, and predict an abnormality;

analyze both the measurement data and the indicator data as the big data aggregated in the measurement database and the indicator database by deep learning that treats a three-layer serial hierarchical structure containing a production condition layer and an environment condition layer as a start point for analysis of a part layer as analysis target layers for each lot of a part, or analyze both the measurement data and the indicator data by the deep learning that treats a four-layer serial hierarchical structure containing a part layer, a production condition layer, and an environment condition layer as a start point for analysis of a finished product layer as analysis target layers for each lot of a finished product and a part pre-associated with each other, and compute an optimal influencing factor condition;

display and process an abnormality prediction result for transmission to a viewer terminal; and display and process the optimal influencing factor condition computed for transmission to the viewer terminal, wherein the computing system aggregates the received measurement data and the received indicator data in a hierarchical structure that takes a logical tree form including a start point, branch points, and end points in the measurement database and the indicator database, respectively, and associates the start point with identification information that specifies a business user of the computing system, the machine learning of the computing system analyzes both the measurement data and the indicator data as the big data aggregated in the measurement database and the indicator database by the machine learning for each lot of the finished product and the part pre-associated with each other, and also for each consolidation target between bases subordinate to the same start point corresponding to the identification information that specifies the business user of the computing system, and the deep learning of the computing system analyzes both the measurement data and the indicator data as the big data aggregated in the measurement database and the indicator database by the deep learning for each lot of the part or for each lot of the finished product and the part pre-associated with each other, and also for each consolidation target between the bases subordinate to the same start point corresponding to the identification information that specifies the business user of the computing system.

16. A non-transitory readable medium recorded with a program that causes a computing system cooperating with an IoT relay device configured to collect measurement data transmitted from a plurality of measurement sources that is distributively arranged in each process in a base corresponding to a manufacturing site and that measures quality conditions in a finished product production process and a part production process, and indicator data that is transmitted from the plurality of measurement sources and that includes an environment indicator and a production indicator acting as influencing factors when measuring the quality conditions, to execute processing comprising:

receiving the measurement data and the indicator data transmitted from the IoT relay device, and aggregating the received measurement data and the received indicator data into a measurement database and an indicator database for generating big data;

analyzing both the measurement data and the indicator data as the big data aggregated in the measurement database and the indicator database by deep learning that treats a three-layer serial hierarchical structure containing a production condition layer and an environment condition layer as a start point for analysis of a part layer as analysis target layers for each lot of a part, or analyzing both the measurement data and the indicator data by the deep learning that treats a four-layer serial hierarchical structure containing a part layer, a production condition layer, and an environment condition layer as a start point for analysis of a finished product layer as analysis target layers for each lot of a finished product and a part pre-associated with each other, and computing an optimal influencing factor condition; and displaying and processing the computed optimal influencing factor condition for transmission to a viewer terminal, wherein the computing system aggregates the received measurement data and the received indicator data in a hierarchical structure that takes a logical tree form including a start point, branch points, and end points in the measurement database and the indicator database, respectively, and associates the start point with identification information that specifies a business user of the computing system, and the computing system analyzes both the measurement data and the indicator data as the big data aggregated in the measurement database and the indicator database by the deep learning for each lot of the part or for each lot of the finished product and the part pre-associated with each other, and also for each consolidation target between bases subordinate to the same start point corresponding to the identification information that specifies the business user of the computing system.

17. A non-transitory readable medium recorded with a program that causes a computing system cooperating with an IoT relay device configured to collect measurement data transmitted from a plurality of measurement sources that is distributively arranged in each process in a base corresponding to a manufacturing site and that measures quality conditions in a finished product production process and a part production process, and indicator data that is transmitted from the plurality of measurement sources and that includes an environment indicator and a production indicator acting as influencing factors when measuring the quality conditions, to execute processing comprising:

receiving the measurement data and the indicator data transmitted from the IoT relay device, and aggregating the received measurement data and the received indicator data into a measurement database and an indicator database for generating big data;

analyzing both the measurement data and the indicator data as the big data aggregated in the measurement database and the indicator database by classifying and cross-checking characteristic tendencies according to machine learning for each lot of a finished product and a part pre-associated with each other, and predicting an abnormality;

analyzing both the measurement data and the indicator data as the big data aggregated in the measurement database and the indicator database by deep learning that treats a three-layer serial hierarchical structure containing a production condition layer and an environment condition layer as a start point for analysis of a part layer as analysis target layers for each lot of a part, or analyzing both the measurement data and the indicator data by the deep learning that treats a four-layer serial hierarchical structure containing a part layer, a production condition layer, and an environment condition layer as a start point for analysis of a finished product layer as analysis target layers for each lot of a finished product and a part pre-associated with each other, and computing an optimal influencing factor condition;

displaying and processing an abnormality prediction result for transmission to a viewer terminal; and displaying and processing the computed optimal influencing factor condition for transmission to the viewer terminal, wherein the computing system aggregates the received measurement data and the received indicator data in a hierarchical structure that takes a logical tree form including a start point, branch points, and end points in the measurement database and the indicator database, respectively, and associates the start point with identification information that specifies a business user of the computing system, the machine learning of the computing system analyzes both the measurement data and the indicator data as the big data aggregated in the measurement database and the indicator database by the machine learning for each lot of the finished product and the part pre-associated with each other, and also for each consolidation target between bases subordinate to the same start point corresponding to the identification information that specifies the business user of the computing system, and the deep learning of the computing system analyzes both the measurement data and the indicator data as the big data aggregated in the measurement database and the indicator database by the deep learning for each lot of the part or for each lot of the finished product and the part pre-associated with each other, and also for each consolidation target between the bases subordinate to the same start point corresponding to the identification information that specifies the business user of the computing system.

* * * * *